(No Model.)
L. F. LONGMORE.
HOSE COUPLING.
No. 320,939. Patented June 30, 1885.
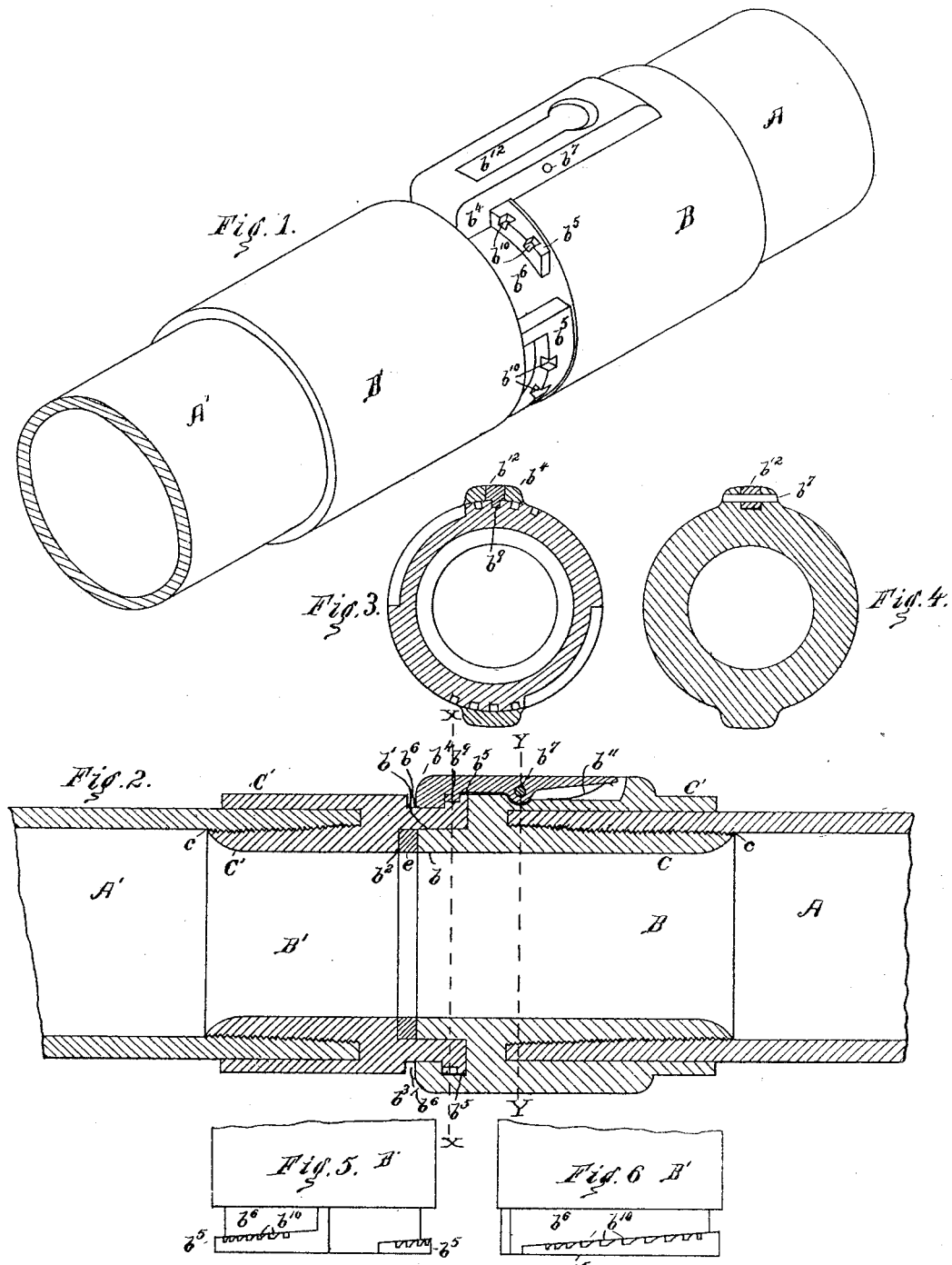

United States Patent Office.

LEWIS F. LONGMORE, OF LOWELL, MASSACHUSETTS, ASSIGNOR OF TWO-THIRDS TO CHARLES W. MOREY, OF SAME PLACE, AND GEORGE A. BYAM, OF CHELMSFORD, MASSACHUSETTS.

HOSE-COUPLING.

SPECIFICATION forming part of Letters Patent No. 320,939, dated June 30, 1885.

Application filed January 30, 1884. (No model.)

*To all whom it may concern:*

Be it known that I, LEWIS F. LONGMORE, a citizen of the United States, residing at Lowell, in the county of Middlesex and Commonwealth of Massachusetts, have invented certain new and useful Improvements in Hose-Couplings, of which the following is a specification.

My invention relates to hose-couplings and to means whereby the counterparts of the same may be quickly joined to each other; also to means of preventing the couplings from accidentally separating from each other.

In the accompanying drawings, Figure 1 is an oblique view of two pieces of hose connected by my improved coupling; Fig. 2, a longitudinal central section of the same through the middle of the pawl; Figs. 3 and 4, sections on the lines X X and Y Y, respectively, in Fig. 2; Figs. 5 and 6, detached views of the ratchet-bearing counterpart of the coupling.

A A' represent lengths of hose-pipe, such as is used for conveying liquids, vapors, and gases. To the ends of the pipes to be joined are attached the counterparts B B' of the coupling, each counterpart B B' being provided with an inner, C, and an outer cylindrical sleeve, C', with an annular space between them. The outside of the inner sleeve, C, is provided with a screw-thread, c. By inserting the end of the hose-pipe of any comparatively soft material—as leather, rubber, or cloth—and turning it, the end of the hose is screwed down into the bottom of the annular space, which is gradually contracted from its outer to its inner end, and is pinched between the outer and inner sleeve, the annular space being just sufficient for that purpose. This construction avoids the necessity of winding the outside of the hose with wire or compressing it by a ring of sheet metal. In other respects the counterparts B B' are not alike, the male counterpart B being reduced at the end $b$, and the female counterpart B' being counterbored at $b'$ to receive the end $b$. A gasket or packing-ring, $c$, is placed between the end $b$ and the shoulder $b^2$. On the outer surface of the end $b'$ are two inclines, $b^3 b^3$, extending nearly half-way around the same. On the outside of the end $b$ of the counterpart B are two diametrically-opposite hooks, $b^3 b^4$, just wide enough to enter freely the spaces $b^6 b^6$ between the inclines, these hooks being cast or rigidly secured to the counterpart B. Within a slot in the hook $b^4$ is a lever, $b^{12}$, pivoted at $b^7$ to said hook $b^4$, the outer end of said lever being provided with a tooth or pawl, $b^9$, to enter corresponding notches, $b^{10}$, on the inclines $b^5$. When the counterparts are pressed together so that the hooks $b^3 b^4$ may enter the spaces $b^6$, and the counterparts are then turned in opposite directions, the hooks will ride upon the inclines, compressing the gasket C and making a tight joint between the counterparts, and the tooth or pawl $b^9$, entering one of the notches $b^{10}$, will prevent the hose from being accidentally uncoupled. The side of each notch is inclined outward on its upper or longer side, so that the pawl will ride over or out of the notches in the act of coupling, but must be raised by pressing down the free end of the pivoted lever to enable the counterparts to be uncoupled. A spring, $b^{11}$, compressed between the said free end of the pivoted lever and the outside of the counterpart B, keeps the pawl engaged with the notches. The sleeves C C' of the same counterpart may be formed in one piece or in separate pieces and then united.

I claim as my invention—

1. The combination of the male and female counterparts, the one provided with inclines having notches, and the other provided with hooks and with a lever having a pawl on its outer end, and a spring, as and for the purpose specified.

2. The combination of the male and female counterparts, the one provided with inclines having notches, and the other provided with hooks, one of said hooks having a slot, and a lever provided with a pawl and pivoted to said hook within said slot, and a spring placed within said slot under the free end of said lever, as and for the purpose specified.

LEWIS F. LONGMORE.

Witnesses:
EDW. W. THOMPSON,
ALBERT M. MOORE.